United States Patent
Ogawa et al.

(10) Patent No.: US 7,427,915 B2
(45) Date of Patent: Sep. 23, 2008

(54) VEHICLE WHEEL INFORMATION PROCESSING DEVICE AND METHOD THEREFOR

(75) Inventors: Atsushi Ogawa, Dusseldorf (DE); Masahiro Yonetani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 167 days.

(21) Appl. No.: 10/566,833

(22) PCT Filed: Sep. 23, 2004

(86) PCT No.: PCT/IB2004/003090

§ 371 (c)(1), (2), (4) Date: Feb. 2, 2006

(87) PCT Pub. No.: WO2005/030498

PCT Pub. Date: Apr. 7, 2005

(65) Prior Publication Data

US 2006/0195233 A1    Aug. 31, 2006

(30) Foreign Application Priority Data

Sep. 25, 2003  (JP)  ............................. 2003-333003

(51) Int. Cl.
*B60C 23/00*  (2006.01)
*B60C 23/02*  (2006.01)

(52) U.S. Cl. .................. 340/442; 340/447; 340/426.33; 73/146.5

(58) Field of Classification Search ................. 340/442, 340/447, 426.33; 73/146, 146.2, 146.4, 146.5; 701/1, 2
See application file for complete search history.

(56) References Cited

U.S. PATENT DOCUMENTS

| 5,749,984 A | 5/1998 | Frey et al. |
| 6,087,930 A | 7/2000 | Kulka et al. |
| 6,271,748 B1 | 8/2001 | Derbyshire et al. |
| 6,486,773 B1 * | 11/2002 | Bailie et al. .................. 340/445 |

(Continued)

FOREIGN PATENT DOCUMENTS

EP    0 925 958 A2    6/1999

(Continued)

*Primary Examiner*—Toan N Pham
(74) *Attorney, Agent, or Firm*—Oliff & Berridge, PLC

(57) ABSTRACT

A vehicle body communication device (200) transmits a request signal to both a wheel side sensor (31) that is provided in a valve (24) of a wheel (22), and a tire side sensor (32) that is embedded in a tire tread (28). When the wheel side sensor (31) and the tire side sensor (32) receive the request signal from the vehicle body communication device (200), respective return signals are transmitted to the vehicle body communication device (200). The respective transmission patterns are set to be different.

25 Claims, 9 Drawing Sheets

U.S. PATENT DOCUMENTS

| | | | |
|---|---|---|---|
| 6,501,372 B2 * | 12/2002 | Lin | 340/442 |
| 6,545,599 B2 | 4/2003 | Derbyshire et al. | |
| 6,580,364 B1 * | 6/2003 | Munch et al. | 340/447 |
| 6,897,770 B2 * | 5/2005 | Lill | 340/445 |
| 6,954,688 B2 * | 10/2005 | Katou | 701/29 |
| 7,095,316 B2 * | 8/2006 | Kachouh et al. | 340/442 |
| 7,104,438 B2 * | 9/2006 | Benedict | 235/375 |
| 2003/0020605 A1 | 1/2003 | Starkey | |
| 2003/0234722 A1 | 12/2003 | Lonsdale et al. | |
| 2004/0201466 A1 | 10/2004 | Ikeda et al. | |
| 2004/0217854 A1 | 11/2004 | Hirohama et al. | |
| 2005/0156722 A1 | 7/2005 | McCall et al. | |

FOREIGN PATENT DOCUMENTS

| | | |
|---|---|---|
| EP | 0 925 959 A2 | 6/1999 |
| EP | 1 336 511 A1 | 8/2003 |
| GB | 2 361 546 A | 10/2001 |
| GB | 2 373 863 A | 10/2002 |
| JP | A-61-201538 | 9/1986 |
| JP | U 5-13802 | 2/1993 |
| JP | A 7-257119 | 10/1995 |
| JP | A-11-240315 | 9/1999 |
| JP | A-11-254926 | 9/1999 |
| JP | A 2001-250186 | 9/2001 |
| JP | A-2003-118333 | 4/2003 |
| JP | A-2003-518281 | 6/2003 |
| JP | A-2003-252014 | 9/2003 |
| JP | A-2004-331009 | 11/2004 |
| WO | WO 02/47924 A1 | 6/2002 |
| WO | WO 03/008246 A1 | 1/2003 |
| WO | WO 2004/021302 A1 | 3/2004 |
| WO | WO 2005/030498 A1 | 4/2005 |

* cited by examiner

VEHICLE WHEEL INFORMATION PROCESSING DEVICE AND METHOD THEREFOR

FIELD OF THE INVENTION

The invention relates to a technology for processing vehicle wheel information. More specifically, the invention relates to a vehicle wheel information processing device and a vehicle wheel information processing method that process vehicle information received from a communication device provided at a vehicle wheel.

BACKGROUND OF THE INVENTION

In order to promote safe running of a vehicle it is essential to maintain the vehicle wheels in a normal state. For example, if the vehicle is run for a long period while the tires have low pressure or high temperature, tire reliability is impaired. This fall in reliability can cause, in certain circumstances, various undesirable phenomenon. To address this problem, technology is required that suitably monitors various states of each wheel, such as the air pressure and temperature of the tire, and warns the driver at an early stage when an abnormality is detected.

Japanese Utility Model Publication No. JP U H5-13802 discloses a tire air pressure warning system including: a vehicle wheel communication device which is provided at a vehicle wheel and which transmits tire air pressure information; and a vehicle body receiver which is provided at a vehicle body and which receives the tire air pressure information from the vehicle wheel communication device.

However, a prerequisite of the tire air pressure warning system of Japanese Utility Model Publication JP U H5-13802 is that a single vehicle wheel communication device is provided in each of the vehicle wheels. As a result, in the case that a plurality of vehicle wheel communication devices are provided in each vehicle wheel, signal interference problems occur. In order to ascertain the state of each vehicle wheel, various types of sensor information related to air pressure, temperature, and the like, are required as vehicle wheel information. Moreover, when temperature is detected, for example, sensor information from different positions or parts, such as the tire and wheel, are necessary. Accordingly, there is a need for a technology that includes a plurality of sensors on each vehicle wheel and a plurality of communication devices for receiving and transmitting respective outputs of the sensors, in which signals transmitted from the plurality of vehicle wheel communication devices are able to be received and processed without interference.

Further, with the tire air pressure warning system of Japanese Utility Model Publication JP U H5-13802, signal transmission by the vehicle wheel communication device is performed using a different prime number cycle for each vehicle wheel. However, with this method, if the number of vehicle wheel communication devices are increased, the transmission cycle becomes longer, which causes variation in the amount of information that can be obtained.

DISCLOSURE OF THE INVENTION

It is an object of the invention to provide a vehicle wheel information processing technology that can accurately receive vehicle wheel information from a plurality of vehicle wheel communication devices.

A vehicle wheel information processing device according to a first aspect of the invention includes: a plurality of vehicle wheel communication devices which are provided at a single vehicle wheel; and a vehicle body communication device that communicates with the plurality of vehicle wheel communication devices. According to the first aspect, a transmission pattern of a signal transmitted from each one of the vehicle wheel communication devices is set to be different to a transmission pattern of a signal from each of the other vehicle wheel communication devices.

Moreover, the plurality of vehicle wheel communication devices may transmit the respective signals as respective return signals in response to a request signal from the vehicle body communication device. Moreover, a plurality of sensors that detect a vehicle wheel quantity of state of the single vehicle wheel may be provided in the single vehicle wheel such that the sensors are respectively connected to the vehicle body communication device. With this configuration, the vehicle body communication device may request an output value, or the like, from each sensor using the request signal, and the output value of each sensor may be transmitted by the vehicle wheel communication devices. Accordingly, it is possible to avoid signal interference of the return signals of the vehicle wheel communication devices, and thus the vehicle body communication device can accurately obtain the vehicle wheel information from the vehicle wheel communication devices.

A vehicle wheel information processing device according to a second aspect of the invention includes: a plurality of vehicle wheel communication devices which are provided at a single vehicle wheel; and a vehicle body communication device that communicates with the plurality of vehicle wheel communication devices. According to the second aspect, each vehicle wheel communication device has an identification number that is different to the identification number of each of the other vehicle wheel communication devices. The vehicle body communication device transmits a request signal including at least one of the identification numbers to the vehicle wheel communication devices. Then, in response, each vehicle wheel communication device is configured to transmit a return signal to the vehicle body communication device in the case that its individual identification number is included within the received request signal. Thus, with this configuration, the vehicle body communication device can specify the vehicle wheel communication device that is the communication target, and obtain the vehicle wheel information from the specified vehicle wheel communication device.

A vehicle wheel information processing device according to a third aspect of the invention includes: a plurality of vehicle wheel communication devices which are provided at a single vehicle wheel; and a vehicle body communication device that communicates with at least one of the plurality of vehicle wheel communication devices. The plurality of vehicle wheel communication devices include (i) a first vehicle wheel communication device that directly communicates with the vehicle body communication device, and (ii) a second vehicle wheel communication device that indirectly communicates with the vehicle body communication device by using the first vehicle wheel communication device as a relay.

A vehicle wheel information processing method according to a fourth aspect of the invention is a method for receiving and processing vehicle wheel information from a plurality of vehicle wheel communication devices provided at a single wheel. This method includes a first step in which respective signals of each of the vehicle wheel communication devices are transmitted to a vehicle body communication device using a transmission pattern that is different for each vehicle wheel communication device. Further, the method also includes a second step in which the respective signals transmitted from each vehicle wheel communication device are received by the vehicle body communication device.

This method may further include a third step in which a request signal from the vehicle body communication device is transmitted to the vehicle wheel communication devices. Moreover, each vehicle wheel communication device may transmit the signal in response to the request signal.

A vehicle wheel information processing method according to a fifth aspect of the invention is a method for receiving and processing vehicle wheel information from a plurality of vehicle wheel communication devices provided at a single wheel. This method includes a first step in which a request signal including at least one identification number for at least one of the vehicle wheel communication devices is transmitted to the vehicle wheel communication devices from the vehicle body communication device. Further, the method also includes a second step in which the vehicle body communication device receives at least one return signal, from the vehicle wheel communication device whose identification number is contained in the request signal.

A vehicle wheel information processing method according to a sixth aspect of the invention is a method for receiving and processing vehicle wheel information from a plurality of vehicle wheel communication devices provided at a single wheel. This method includes a first step in which a first vehicle wheel communication device included among the plurality of vehicle wheel communication devices transmits a signal to a vehicle body communication device; a second step in which a second vehicle wheel communication device transmits a signal to the first vehicle wheel communication device; and a third step in which the first vehicle communication device transfers the signal received from the second vehicle wheel communication device to the vehicle body communication device.

It should be noted that the term "identification number" as used in the above description is taken to indicate both a number or a code.

According to the vehicle wheel information processing device and the method of the invention it is possible for the vehicle body communication device to accurately obtain necessary vehicle wheel information while interference between the signals is avoided.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

First Embodiment

Figure 1:
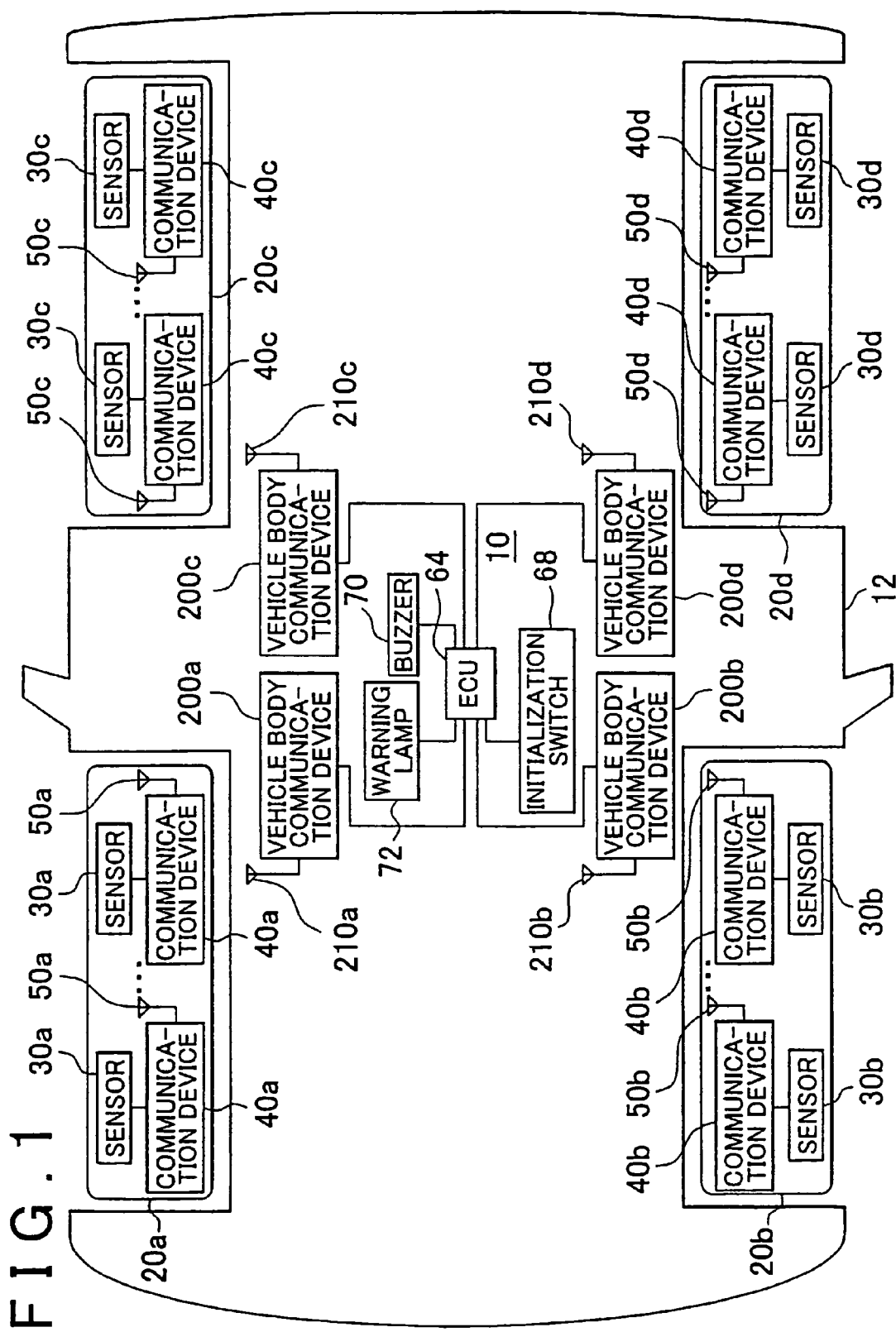
FIG. 1 shows the overall configuration of a vehicle provided with a vehicle wheel information processing device according to a first embodiment of the invention.

FIG. 1 shows the overall configuration of a vehicle 10 provided with a vehicle wheel information processing device according to a first embodiment of the invention. The vehicle 10 includes four vehicle wheels 20a to 20d and a vehicle body 12. The vehicle wheels 20a to 20d are provided with (i) respective sensors 30a to 30d that detect a respective vehicle wheel quantity of state, (ii) respective communication devices 40a to 40d that transmits information related to the detected vehicle wheel quantity of state (hereinafter simply referred to as "vehicle wheel information") to the vehicle body 12, and (iii) respective communication antennas 50a to 50d for communication use. Further, the vehicle body 12 includes (i) vehicle body communication devices 200a to 200d that receive the vehicle wheel information from the respective vehicle wheels 20a to 20d, (ii) respective antennas 210a to 210d for communication use, (iii) an electronic control unit (hereinafter referred to as "ECU") 64 that performs overall control of the vehicle 10, (iv) an initialization switch 68, (v) a warning buzzer 70, (vi) and a warning lamp 72. In order to simplify the explanation presented hereinafter, the reference numerals a to d for each of the structural members, such as the wheels 20a to 20d, will be omitted. Accordingly, in general, an explanation of the structure will be given for a single one of the wheels 20.

The plurality of sensors 30 included in the wheel 20 transmit respective sensor output values to the communication device 40. These sensor output values are then wirelessly transmitted to the vehicle body communication device 200 via the antenna 50. Note that, the communication device 40 and the antenna 50 may be incorporated within the sensor 30.

The vehicle body communication device 200 receives the vehicle wheel information from the communication device 40 via the antenna 210 (which is provided in the vicinity of the vehicle wheel 20), and then transmits the received vehicle wheel information to the ECU 64. The ECU 64 then ascertains the state of the vehicle wheel 20 based on the vehicle wheel information received from the vehicle body communication device 200. Then, for example, if a tire temperature of the vehicle wheel 20 is above a predetermined value, or if a tire air pressure of the vehicle wheel 20 is below a predetermined value, the warning lamp 72 is lit or the buzzer 70 issues a warning sound so as to inform a driver that state of the vehicle wheel 20 is abnormal.

The ECU 64 includes a storage portion that stores attachment position information and identification information (which may include, for example, numbers and codes for identification) for each of the plurality of sensors 30 provided in the wheel 20. When an engine, not shown, of the vehicle 10 is started, the vehicle body communication device 200 receives the identification information from each of the plurality of sensors 30 of the vehicle wheel 20. Then, the ECU 64 suitably updates the identification information stored in the storage portion. Note that, the initialization switch 68 is pressed by the driver at times when the vehicle wheels 20 are rotated or replaced. When the initialization switch 68 is pressed, a control is performed such that each vehicle body communication device 200 receives a signal including the identification information from the sensor 30 provided in the wheel 20 at a position corresponding to the vehicle body communication device 200. Thus, the ECU 64 updates the attachment position information and the identification information concerning the sensors 30 that is stored in the storage portion. The information is updated based on the vehicle wheel information that is received by the vehicle body communication device 200 from each of the vehicle wheels 20 following pressing of the initialization switch 68.

Figure 2:
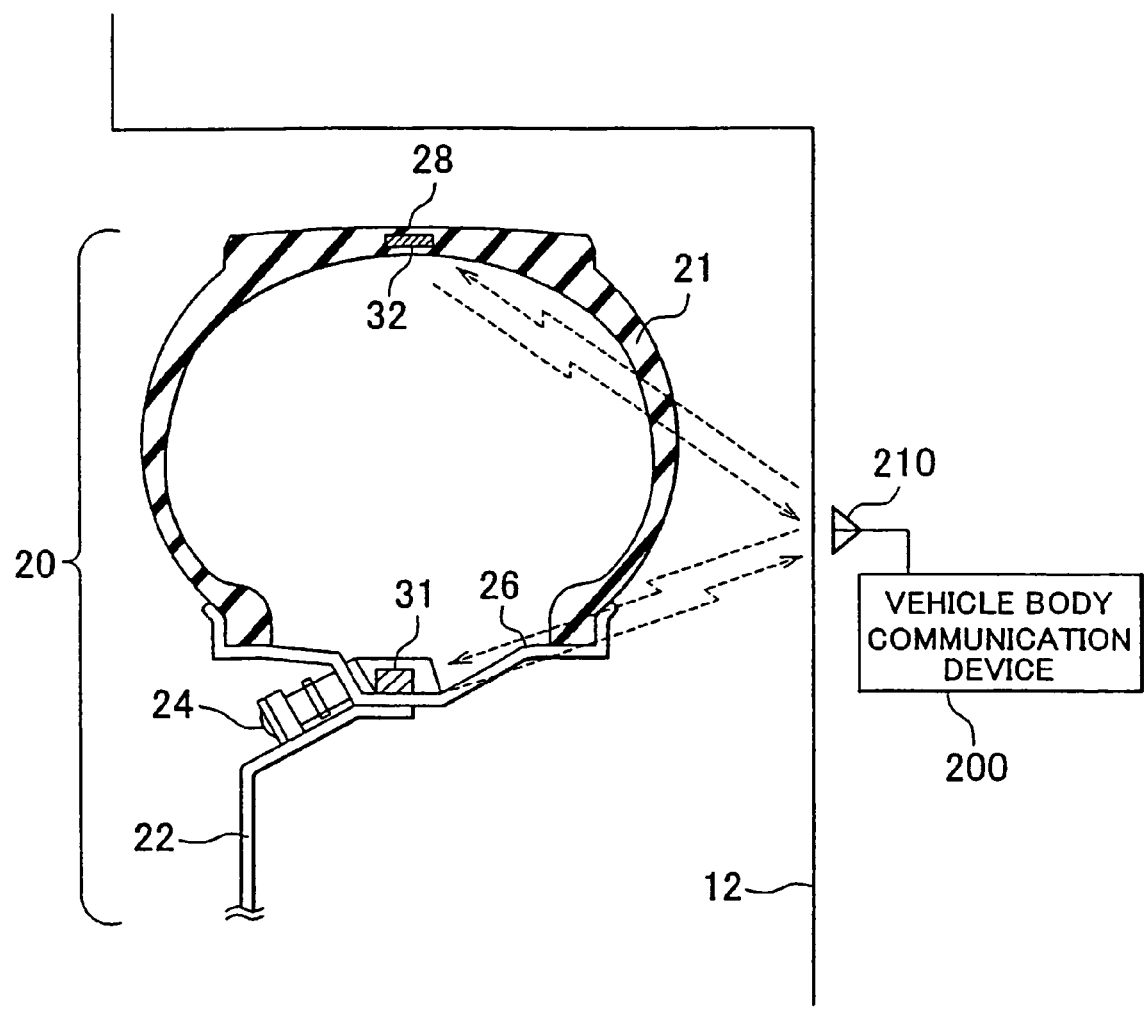
FIG. 2 shows respective attachment positions of a plurality of sensors provided at a tire shown in FIG. 1.

FIG. 2 is a cross section view of the vehicle wheel 20, and illustrates the respective attachment positions and configuration of the plurality of sensors 30, which are provided at the vehicle wheel 20 as described with regard to FIG. 1. The vehicle wheel 20 includes a tire 21, a wheel 22, and a rim 26. A wheel side sensor 31 is assembled to a valve 24 of the wheel 22 so as to be integrated therewith. Further, a tire side sensor 32 is embedded within a tire tread 28. The wheel side sensor 31 is a multi-function sensor that includes an air pressure sensor that detects an air pressure of the tire 21, and a temperature sensor that detects a temperature of the air within the tire 21. The tire side sensor 32 is a temperature sensor that detects a temperature of the tire tread 28. Thus, in this example, two of the sensors 30 are provided in the form of the wheel side sensor 31 and the tire side sensor 32. However, the invention is not limited to a configuration in which the sensors 30 are provided at both the wheel side and the tire side of the vehicle wheel 20. Accordingly, the plurality of the sensors 30 may be provided, for example, entirely on the wheel side, or entirely on the tire side. The wheel side sensor 31 and the tire side sensor 32 respectively incorporate the sensor 30, the communication device 40 and the antenna 50 that were described with regard to FIG. 1, and wirelessly communicate with the vehicle body communication device 200 of the vehicle body 12 via the antenna 50.

The vehicle body communication device 200 transmits a request signal to the wheel side sensor 21 and the tire side sensor 32. When the wheel side sensor 31 and the tire side sensor 32 receive this request signal, an appropriate reply is sent back to the vehicle body communication device 200. Note that, two-way communication is performed between the vehicle body communication device 200 and the wheel side sensor 31, and between the vehicle body communication device 200 and the tire side sensor 32. This two-way communication utilizes a low frequency band.

When communication is performed wirelessly using a low frequency band, it is normal to exchange signals without attaching identification information that specifies the communication source and communication target. This is because it is unlikely that interference with other signals will occur when the communication range is short. However, in this embodiment, the wheel side sensor 31 and the tire side sensor 32 communicate wireless over a short range with the vehicle body communication device 200 provided in the vicinity of the vehicle wheel 20. With this configuration, if no identification information is included with the communication signals to allow the respective signals to be distinguished, it is possible that signal interference will occur if the respective transmission timings of the communication signals of the wheel side sensor 31 and the tire side sensor 32 overlap with each other.

Note that, although the communication range is short, there is a slight chance that signal interference will occur among the four wheels 20a to 20d. In other words, it is possible for a transmission signal from the sensor 30 of the front left wheel 20b to be received by the vehicle body communication device 200 provided in the vicinity of the front right wheel 20a. However, even if signal interference does occur between the wheels 20a to 20d, it is possible for the vehicle body communication device 200 of any one of the wheels to distinguish whether a signal which has been received by the vehicle body communication device 200 is from its own or another wheel, based on difference in the number of responses to one request signal, and difference in the strength of the received signal. Accordingly, hereinafter, an explanation will be given of a communication procedure that enables the vehicle body communication device 200, the wheel side sensor 31 and the tire side sensor 32 to inhibit signal interference within the same wheel 20.

Figure 3:
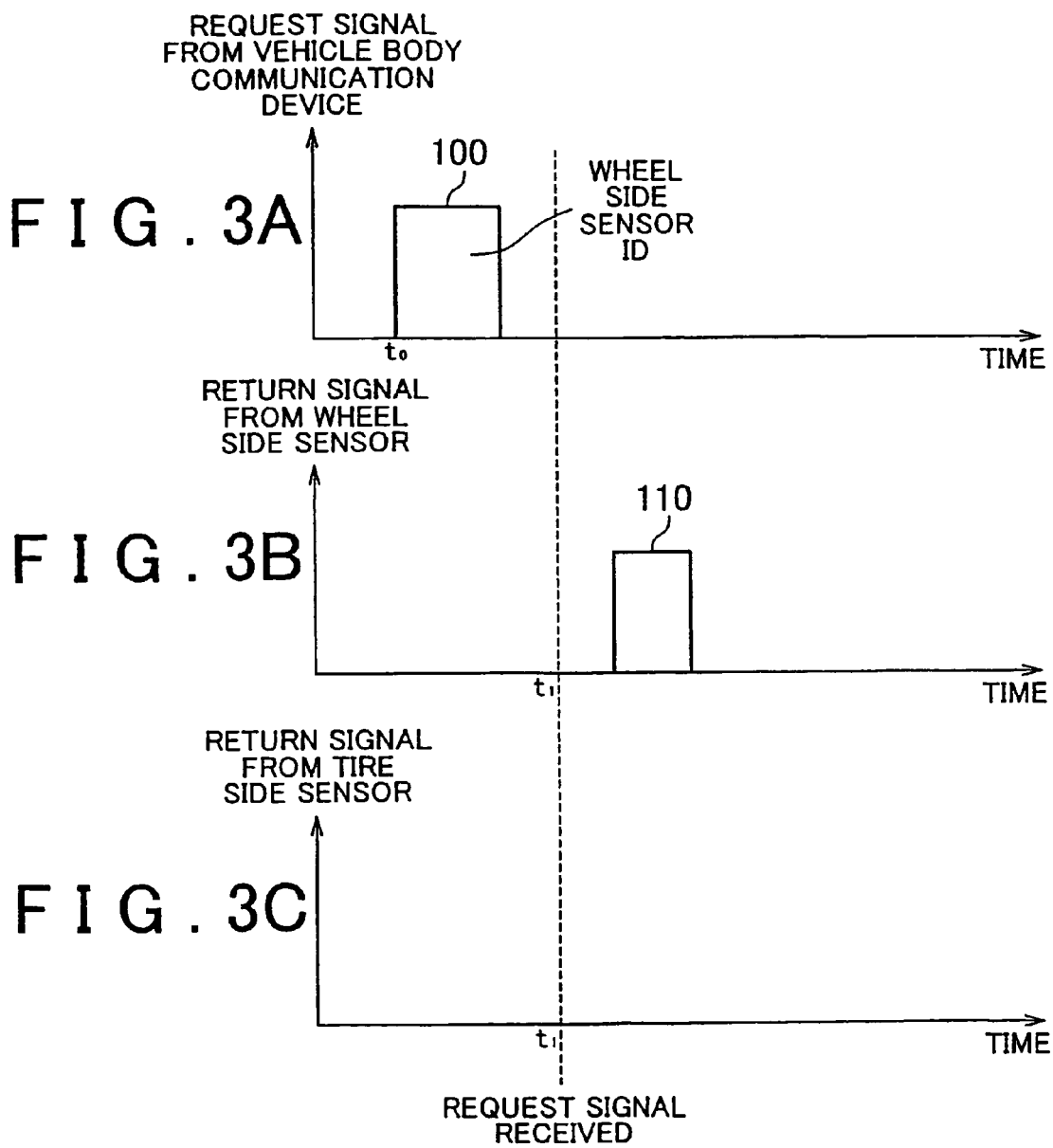
FIGS. 3A to 3C illustrate a procedure in which, in response to a request signal which specifies a sensor and which is transmitted by a vehicle body communication device shown in FIG. 2, the sensor transmits a return signal.

FIGS. 3A to 3C illustrate a communication procedure of the vehicle body communication device 200, the wheel side sensor 31 and the tire side sensor 32, when the vehicle body communication device 200 specifies a communication target using identification information. As shown in FIG. 3A, at time t0, the vehicle body communication device 200 transmits a request signal 100 (which specifies identification information of the wheel side sensor 31) to the wheel side sensor 31 and the tire side sensor 32. Then, at time t1, the wheel side sensor 31 and the tire side sensor 32 receive the request signal 100 transmitted from the vehicle body communication device 200. Since the request signal 100 received by the wheel side sensor 31 includes identification information that specifies the wheel side sensor 31 itself (hereinafter, identification information that specifies any particular sensor will be referred to as "self-identifying identification information"), the wheel side sensor 31 transmits a return signal 110 to the vehicle body communication device 200 as shown in FIG. 3B. In other words, the vehicle body communication device transmits, to the plurality of vehicle wheel communication devices, a request signal including the identification information of one of the plurality of vehicle wheel communication devices. From among the plurality of vehicle wheel communication devices, only the vehicle wheel communication device having the identification information that is the same as the identification information included in the received signal outputs the return signal. On the other hand, since the request signal 100 received by the tire side sensor 32 does not include such self-identifying identification information, the tire side sensor 32 does not issue a reply, as can be seen from FIG. 3C.

In this way, the vehicle body communication device 200 attaches to the request signal 100 the identification information that specifies one of the plurality of sensors 30 provided in one of the wheels 20. By doing so, the vehicle body communication device 200 is able to select one of the sensors 30 as the communication target by broadcasting the same request signal 100 to each of the plurality of sensors 30. Accordingly, signal interference can be avoided.

Figure 4:
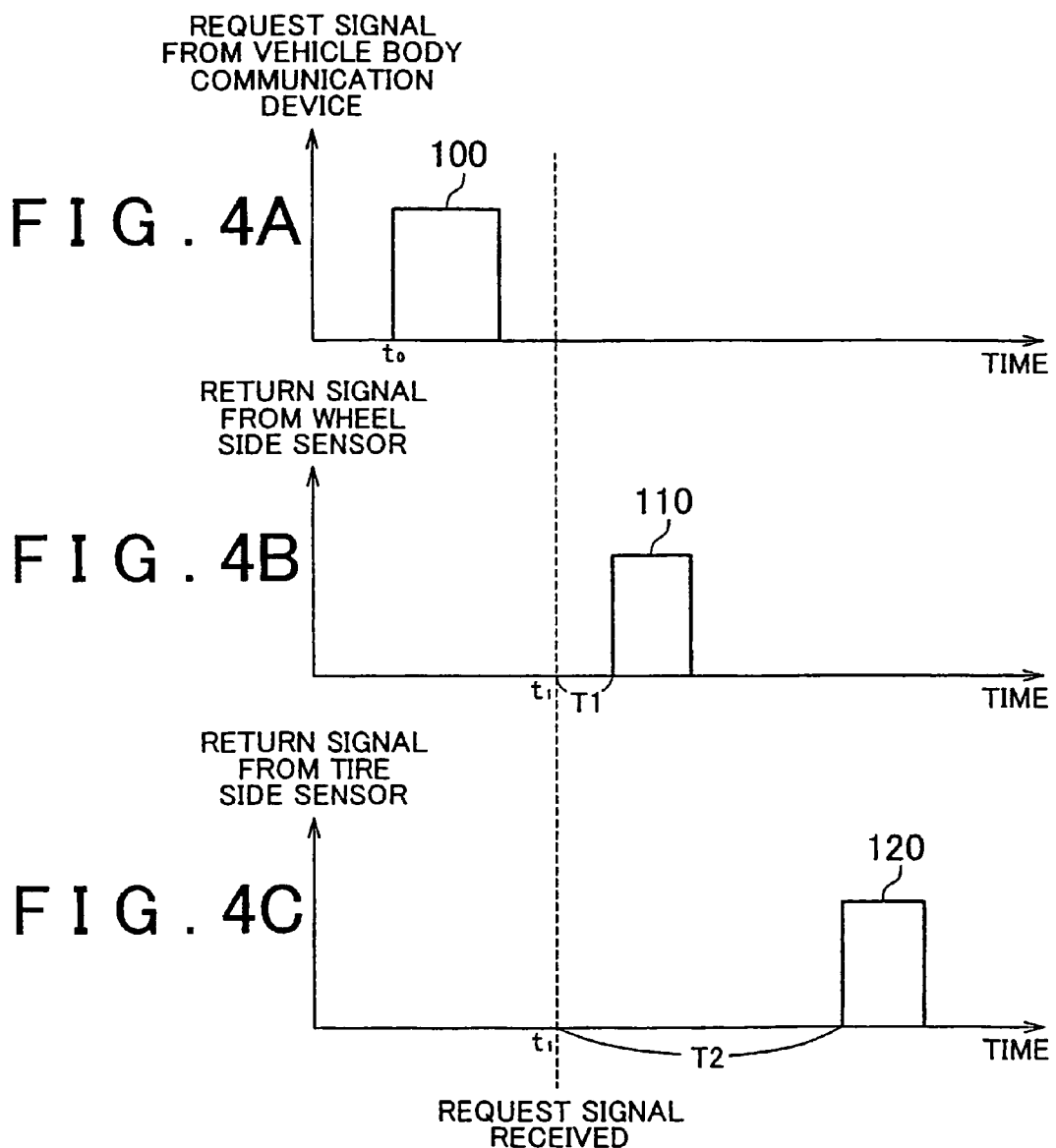
FIGS. 4A to 4C illustrate a procedure in which, in response to a request signal transmitted by the vehicle body communication device shown in FIG. 2, a plurality of sensors transmit respective return signals at a transmission start timing that is different for each sensor.

FIGS. 4A to 4C illustrate a communication procedure in which a transmission start timing of respective return signals that responds to the request signal 100 from the vehicle body communication device 200 is set to be different for the wheel side sensor 31 and the tire side sensor 32. As shown in FIG. 4A, at time t0, the vehicle body communication device 200 transmits the request signal 100 to the wheel side sensor 31 and the tire side sensor 32. In this example, the vehicle body communication device 200 does not specifically select either the wheel side sensor 31 or the tire side sensor 32. Instead, the vehicle body communication device 200 transmits the request signal 100 to both of the sensors 31 and 32, and requests that the sensors 31 and 32 transmit their respective detection values.

At time t1, the wheel side sensor 31 and the tire side sensor 32 receive the request signal 100 from the vehicle body communication device 200. Then, as shown in FIG. 4B, the wheel side sensor 31 sets a transmission start timing for the return signal 110 to be a time that is an elapsed period T1 after the time t1 when the request signal 100 was received. On the other hand, the tire side sensor 32, as shown in FIG. 4C, sets a transmission start timing for a return signal 120 to be a time that is an elapsed period T2 after the time t1 when the request signal 100 was received. Accordingly, the transmission start timing of the return signal 110 of tire side sensor 32 is delayed so as to be later than that of the wheel side sensor 31.

As a result of staggering the transmission start timings in this way, the transmission timings of the respective return signals 110 and 120 of the wheel side sensor 31 and the tire side sensor 32 do not overlap with each other. Accordingly, signal interference is avoided. The vehicle body communication device 200 is able to reliably receive the respective return signals 110 and 120 from the wheel side sensor 31 and the tire side sensor 32 without being affected by signal interference. Moreover, the elapsed times T1 and T2 are set to be different for the respective transmission start timings for the two return signals 110 and 120. Accordingly, it is possible for the vehicle body communication device 200 to distinguish between the two return signals 110 and 120.

Figure 5:
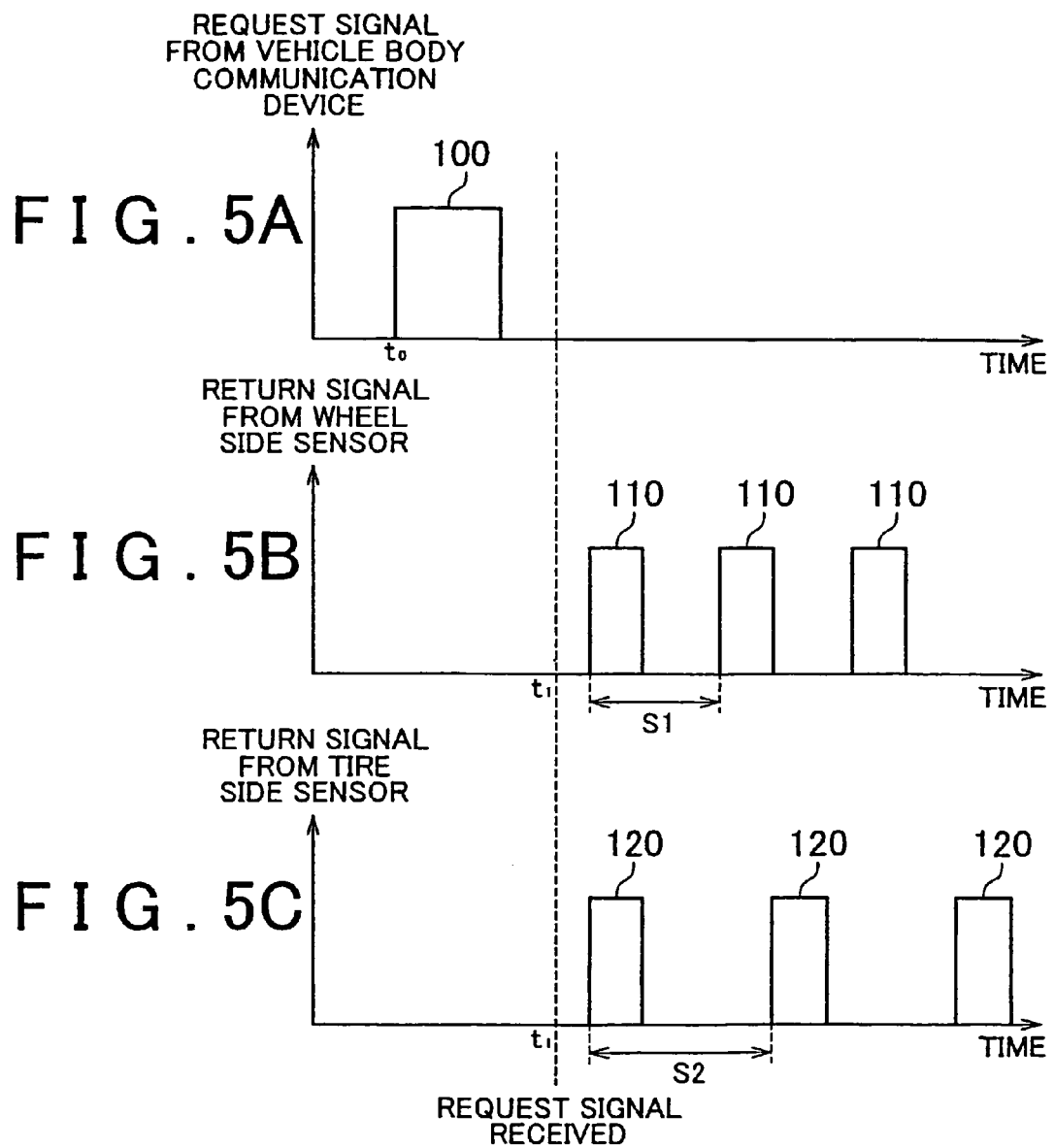
FIGS. 5A to 5C illustrate a procedure in which, in response to a request signal which is transmitted by the vehicle body communication device shown in FIG. 2, the plurality of sensors transmits respective return signals at a transmission cycle that is different for each sensor.

FIGS. 5A to 5C illustrate a communication procedure in which a transmission cycle of respective return signals that respond to the request signal 100 from the vehicle body communication device 200 are set to be different for the wheel side sensor 31 and the tire side sensor 32. As shown in FIG. 5A, at time t0, the vehicle body communication device 200 transmits the request signal 100 to the wheel side sensor 31 and the tire side sensor 32. Then, at time t1, the wheel side sensor 31 and the tire side sensor 32 receive the request signal 100 transmitted from the vehicle body communication device 200. The wheel side sensor 31, as shown in FIG. 5B, transmits the return signal 110 at a transmission cycle S1. Further, the tire side sensor 32 transmits the return signal 120 at a transmission cycle S2.

The respective transmission cycles, i.e. time pattern with the intervals S1 and S2, of the respective return signals 110 and 120 of the wheel side sensor 31 and the tire side sensor 32 are set to be different. Thus, as shown in FIGS. 5B and 5C, a time difference is generated between transmission of the respective signals, whereby signal interference of the two return signals 110 and 120 is avoided. Accordingly, the vehicle body communication device 200 is able to distinguish between the respective return signals 110 and 120 of the wheel side sensor 31 and the tire side sensor 32 based on the respective transmission cycles S1 and S2.

Figure 6:
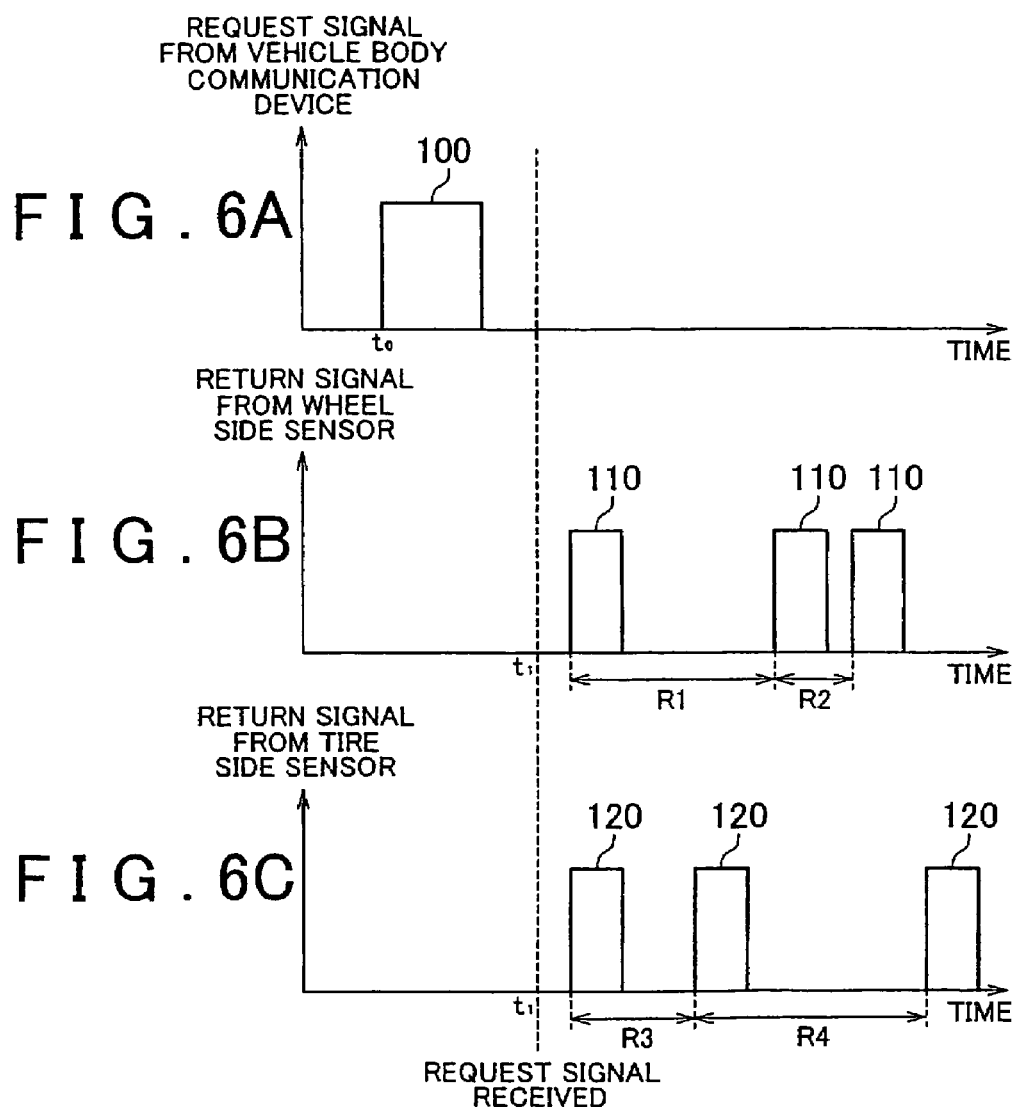
FIGS. 6A to 6C illustrate a procedure in which, in response to a request signal which is transmitted by the vehicle body communication device shown in FIG. 2, the plurality of sensors transmits respective return signals with a random transmission interval.

FIGS. 6A to 6C illustrate a communication procedure in which respective transmission intervals of the return signals that respond to the request signal 100 from the vehicle body communication device 200 are set at random. As shown in FIG. 6A, at time t0, the vehicle body communication device 200 transmits the request signal 100 to the wheel side sensor 31 and the tire side sensor 32. At time t1, the wheel side sensor 31 and the tire side sensor 32 receive the request signal 100 from the vehicle body communication device 200. Then, as shown in FIG. 6B, the wheel side sensor 31 transmits the return signal 110 a plurality of times at respective random transmission intervals R1 and R2. Further, the tire side sensor 32 transmits the return signal 120 a plurality of times at respective random transmission intervals R3 and R4, as shown in FIG. 6C.

The respective transmission intervals of the return signals 110 and 120 of the wheel side sensor 31 and tire side sensor 32 are set at random. Of course, there is a chance that the transmission timing of the return signals 110 and 120 will overlap. However, the two return signals 110 and 120 are transmitted a plurality of times, and the transmission intervals R1 and R2 of the return signal 110 of the wheel side sensor 31 and the transmission intervals R3 and R4 of the return signal 120 of the tire side sensor 32 are different, as shown in FIGS. 6B and 6C. Thus, difference is generated in the respective transmission times of the two return signals 110 and 120 that are transmitted a plurality of times, whereby it is possible to avoid overlap of the transmissions timings. Accordingly, signal interference is avoided. The return signal 110 of the wheel side sensor 31 and the return signal 120 of the tire side sensor 32 additionally may have data formats that are different from each other. For example, the bit lengths of the data may be different. Thus, the vehicle body communication device 200 is able to distinguish between the respective return signals 110 and 120 of the wheel side sensor 31 and the tire side sensor 32 based on the difference in the data formats.

As described above, the respective return signals 110 and 120 of the wheel side sensor 31 and the tire side sensor 32 have transmission patterns that are set to be different from each other. As a result, the vehicle body communication device 200 can receive the two return signals 110 and 120 without signal interference occurring, and can also distinguish between the two return signals 110 and 120 based on the transmission patterns. Accordingly, there is no need for the wheel side sensor 31 and the tire side sensor 32 to attach sensor identification information to the transmission signal, and it is possible to avoid signal interference using a simple procedure.

Second Embodiment

Figure 7:
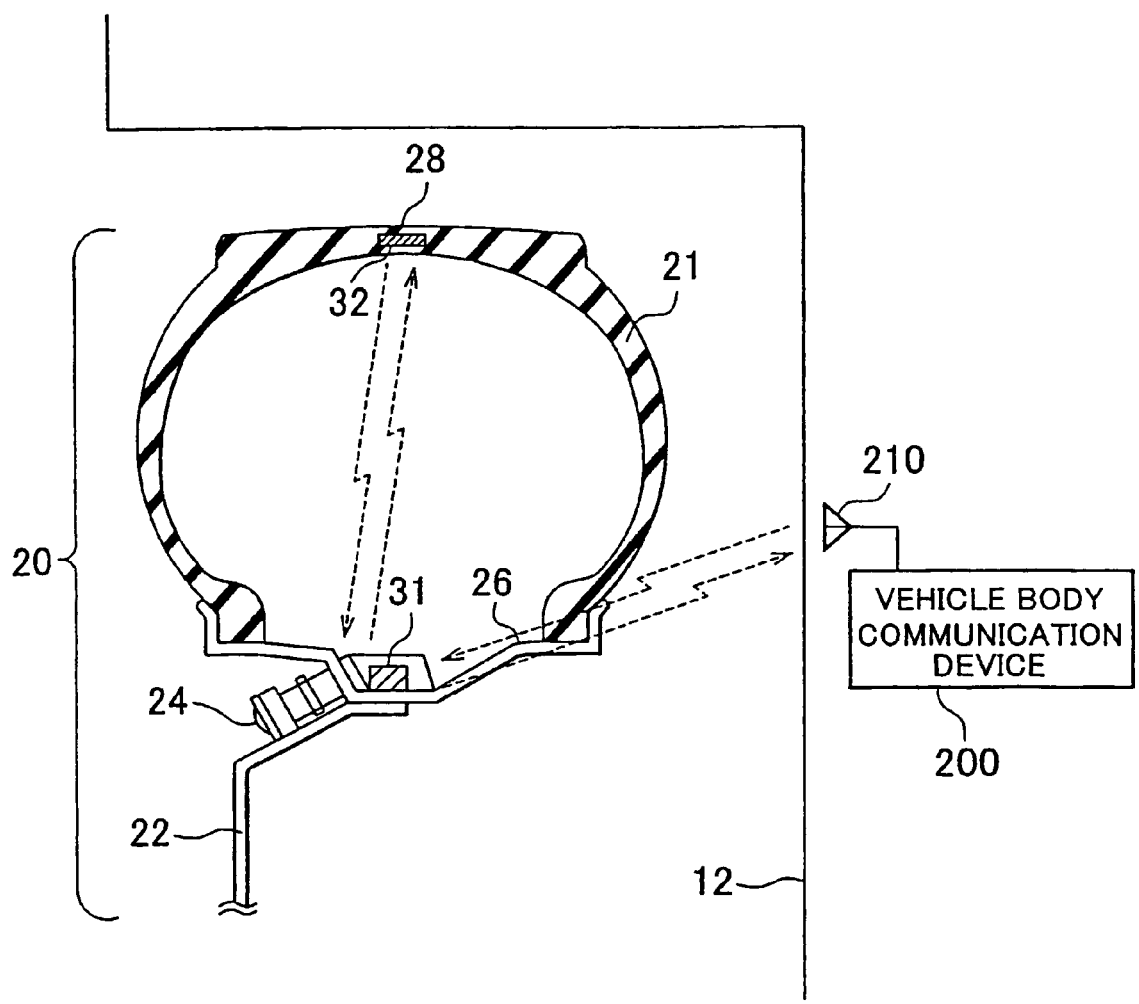
FIG. 7 is an explanatory diagram showing how communication is performed between a vehicle body communication device and a plurality of sensors according to a second embodiment of the invention.

The second embodiment has the same structure as the first embodiment, but differs with respect to the communication procedure that is used for communication between the plurality of sensors 30 and the vehicle body communication device 200. FIG. 7 is an explanatory diagram showing how communication is performed between the wheel side sensor 31 and the tire side sensor 32 and the vehicle body communication device 200 in the second embodiment. According to this embodiment of the invention, the tire side sensor 32 does not directly communicate with the vehicle body communication device 200. Instead, the tire side sensor 32 attaches self-identifying identification information to its output signal, and transmits the signal wirelessly to the wheel side sensor 31. When the wheel side sensor 31 receives the output signal from the tire side sensor 32, it transfers the output signal to the vehicle body communication device 200. In addition, the wheel side sensor 31 attaches self-identifying identification information to its own output signal, and directly transmits this output signal to the vehicle body communication device 200. The vehicle body communication device 200 is able to distinguish between the output signal of the wheel side sensor 31 that is directly received from the wheel side sensor 31 and the output signal from the tire side sensor 32 that is indirectly received via the wheel side sensor 31 based on the respective sets of identification information attached thereto.

Figure 8:
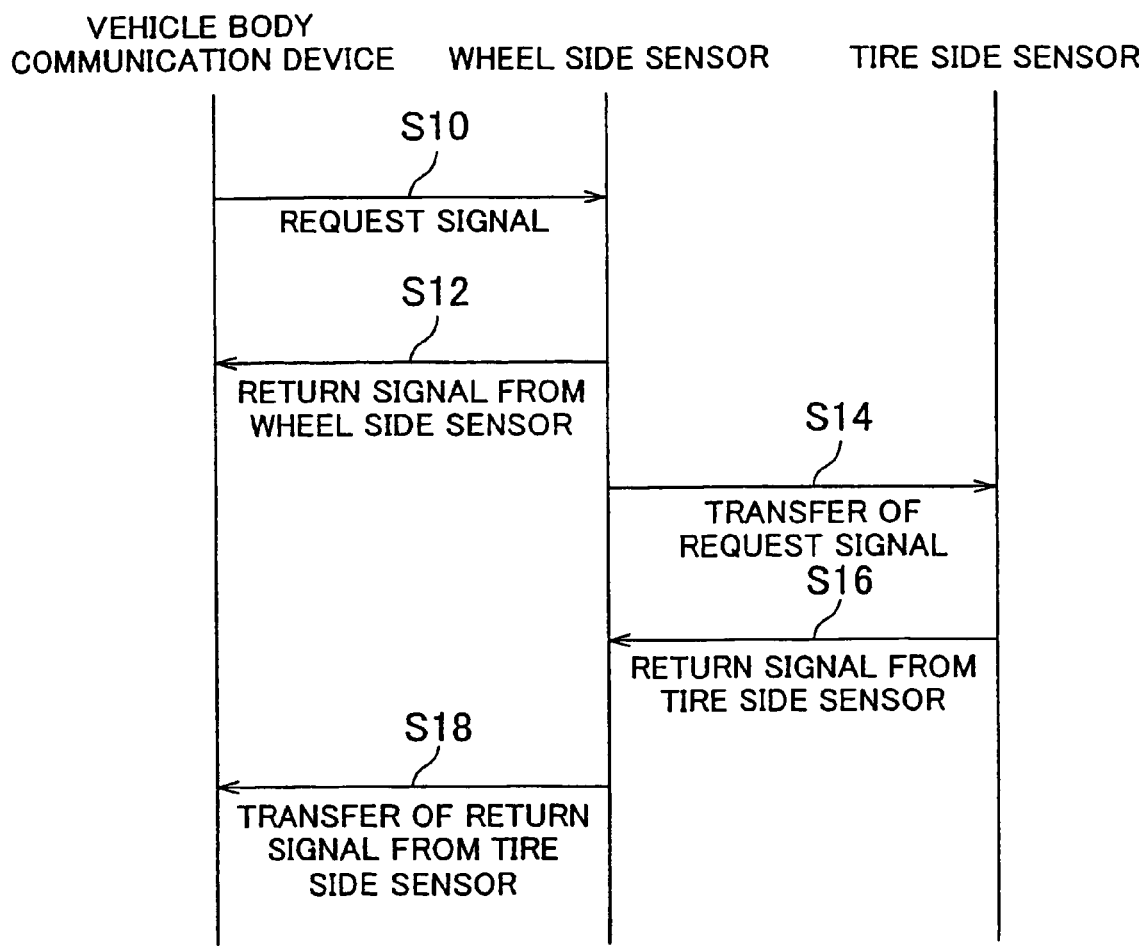
FIG. 8 is an explanatory diagram of a communication procedure for the vehicle body communication device and the plurality of sensors shown in FIG. 7.

FIG. 8 is an explanatory diagram of a communication procedure for the vehicle body communication device 200, the wheel side sensor 31, and the tire side sensor 32. In step S10, the vehicle body communication device 200 transmits a request signal to the wheel side sensor 31. Then, in step S12, the wheel side sensor 31 attaches self-identifying identification information to the request signal, and transmits it to the vehicle body communication device 200.

In step S14, the wheel side sensor 31 transfers the request signal from the vehicle body communication device 200 to the tire side sensor 32. Then, in step S16, the tire side sensor 32 transmits a return signal with attached self-identifying identification information to the wheel side sensor 31. The wheel side sensor 31 then transfers the return signal received from the tire side sensor 32 to the vehicle body communication device 200 in step S18.

In the above procedure, in step S12, the wheel side sensor 31 transmits its own return signal to the vehicle body communication device 200. However, modification of this procedure is possible. For example, step S12 may be omitted, and, in step S18, the wheel side sensor 31 may transmit its own return signal, along with that of the tire side sensor 32, to the vehicle body communication device 200.

In this embodiment, the wheel side sensor 31 functions as a relay for communication of the tire side sensor 32. Thus, the transmission timing of the return signal of the wheel side sensor 31 and the return signal of the tire side sensor 32 do not overlap with each other. That is, the vehicle body communication device 200 receives the return signal only from the wheel side sensor 31. Therefore, basically, signal interference does not occur. Since the tire side sensor 32 performs short range wireless communication with the wheel side sensor 31, the communication range is short as compared to the case when the tire side sensor 32 communicates with the vehicle body communication device 200 on the vehicle body 12 side. Accordingly, communication can be performed with minimal electric power. Thus, for example, in the case that the tire side sensor 32 is battery driven, it is possible to keep the power consumption of the battery to low levels. Further, the wheel side sensor 31 is located closer to the axle of the wheel 20 than the tire side sensor 32. Accordingly, when the wheel side sensor 31 functions as a relay as with the configuration of this embodiment (as compared to if the tire side sensor 32 were to perform the role of the relay), it is possible for communication between the relay and the vehicle body communication device 200 to be performed stably.

It should be noted that in step S16 the tire side sensor 32 transmits the return signal to the wheel side sensor 31 using short range wireless communication. However, the transmission signal of the tire side sensor 32 may conceivably reach the vehicle body communication device 200 via the antenna 210. As a result, there is a possibility that signal interference may be caused by the vehicle body communication device 200 receiving the transmission signal of the tire side sensor 32 and the transmission signal of the wheel side sensor 31. To address this problem, as with the first embodiment described above, the transmission pattern of the respective return signals of the wheel side sensor 31 and the tire side sensor 32 may be set to be different from each other, whereby signal interference within the vehicle body communication device 200 can be avoided. For example, the tire side sensor 32 may transmit signals at a different transmission frequency to the wheel side sensor 31. Accordingly, it is possible for the vehicle body communication device 200 to distinguish whether a signal that it has received is from the wheel side sensor 31 or the tire side sensor 32.

Figure 9:
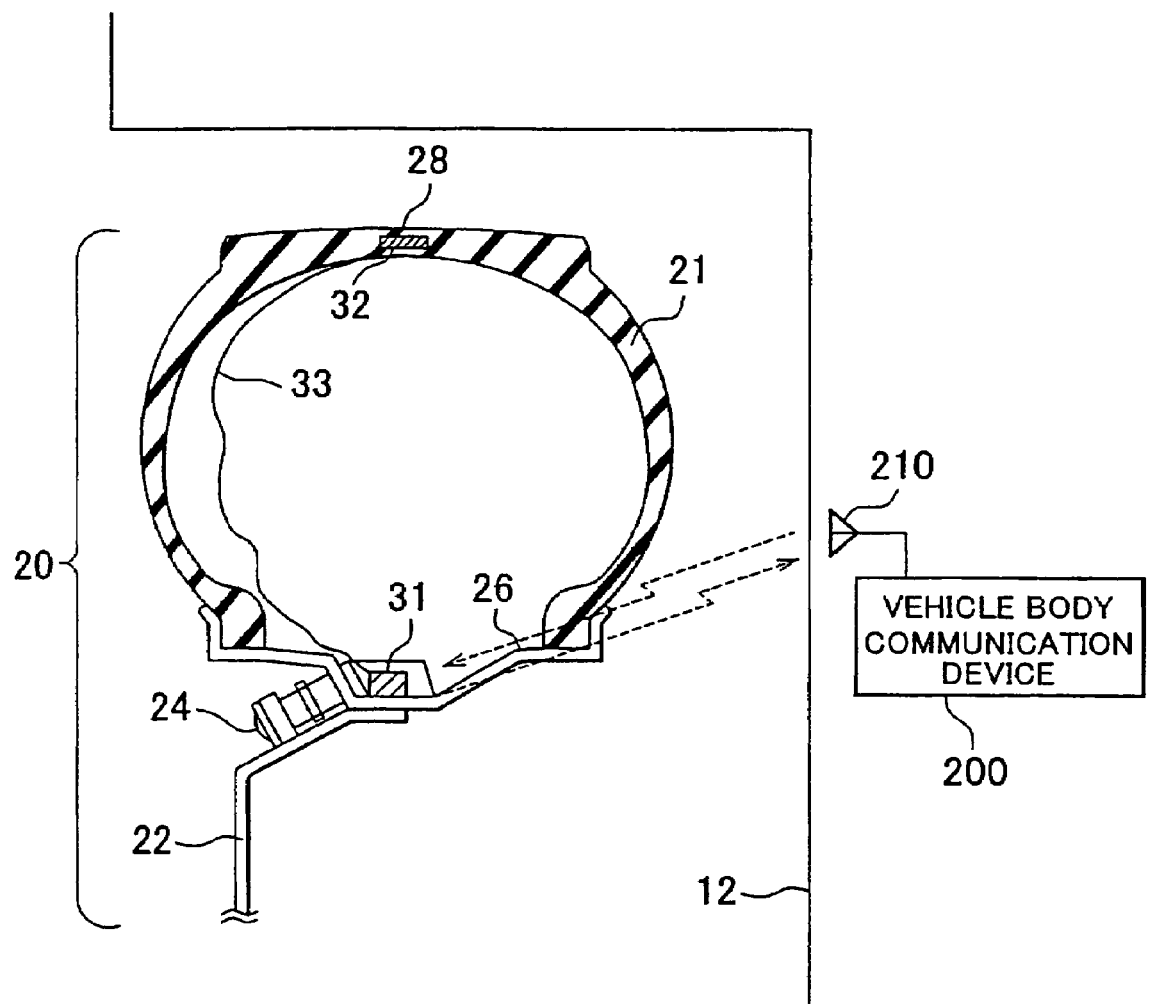
FIG. 9 is an explanatory diagram showing another communication mode for the vehicle body communication device and the plurality of sensors.

FIG. 9 is an explanatory diagram showing another mode in which communication of the vehicle body communication device 200, the wheel side sensor 31, and the tire side sensor 32 may be performed. In the configuration of FIG. 7, the tire side sensor 32 and the wheel side sensor 31 perform two-way wireless communication. However, in the configuration of FIG. 9, the tire side sensor 32 and the wheel side sensor 31 are connected by a connection wire 33, and the output signal of the tire side sensor 32 is transmitted to the wheel side sensor 31 by wire. However, with the exception of the fact that communication between the tire side sensor 32 and the wheel side sensor 31 is performed by wire instead of wirelessly, the communication procedure utilized is the same as that of FIG. 8. With this modified form, the tire side sensor 32 does not require either the communication device 40 or the antenna 50. Accordingly, it is possible to reduce the cost of the tire side sensor 32. It should be noted that this cost reduction of the tire side sensor 32 is particularly important since the tire side sensor 32 is disposed off along with the tire 21 when the tire 21 is replaced.

Hereinabove, the invention has been explained with reference to various embodiments. However, the above embodiments are merely examples, and it will be clearly apparent to a person skilled in the art that other modifications may be made without departing from the scope of the invention. A variety of these possible modification will be explained below.

The communication device 40 on the vehicle wheel side may be a transponder in which an electric power source power that is supplied in accordance with radio waves from the vehicle body communication device 200. Moreover, the communication device 40 may be battery driven and include a built-in battery. In the configuration described above, two-way communication is performed between the communication device 40 on the vehicle wheel side and the vehicle body communication device 200. Further, the communication device 40 transmits a return signal in response to the request signal from the vehicle body communication device 200. However, the configuration may be such that the communication device 40 on the vehicle wheel side only has a transmission function, and the vehicle body communication device 200 only has a reception function. In this case, the communication procedure may be modified such that the detection values of the sensors 30 are regularly transmitted from the communication device 40 to the vehicle body communication device 200. For example, as shown in FIGS. 5A to 5C, the transmission cycle of the wheel side sensor 31 may be different to that of the tire side sensor 32. Also, as shown in FIGS. 6A to 6C, each of the wheel side sensor 31 and the tire side sensor 32 may transmits a signal at random intervals.

According to the shown embodiments, the communication of the sensors of a vehicle wheel is effected with separate individual vehicle body communication devices, respectively. However, it should be noted that the communication devices 200 $a$ to 200 $d$ can be condensed to a single vehicle body communication device at which the signals are processed centrally.

According to the first and second embodiments, as an example of the plurality of the sensors 30 provided at the vehicle wheel 20, a configuration has been described in which the wheel side sensor 31 is provided at the valve 24 of the wheel 22 and the tire side sensor 32 is provided at the tire tread 28. However, this is merely one example of where the sensors may be attached. Other attachment positions are of course conceivable, and, for example, a sensor may be provided at the rim 26 of the wheel 22. Further, the type of sensor is not limited to air pressure sensors and temperature sensors. Various other types of sensor may be used, such as speed sensors, acceleration sensors, or the like, that detect respective vehicle wheel quantities of state.

According to the first and second embodiments, the vehicle body communication device 200 distinguishes between the return signal of the wheel side sensor 31 and the return signal of the tire side sensor 32 based on the difference in the transmission start timing, the transmission cycle, the data format, the identification information, or the like. However, if the signals cannot be distinguished using one of these parameters, the ECU 64 may determine whether a particular signal is from the wheel side sensor 31 or the tire side sensor 32 by analyzing the signal received from the vehicle body communication device 200.

For example, if both the wheel side sensor 31 and the tire side sensor 32 are temperature sensors that have the same data format, it is not possible to distinguish between them using the respective data formats. However, the ECU 64 can observe the temperature changes that have occurred since the initialization switch 68 was pressed based on the signals received from the temperature sensors. Using this information, the ECU 64 is able to determine that the received signal that shows the greater temperature rise is the signal from the tire side sensor 32. This determination is based on the fact that tire side sensor 32 detects the temperature of the tire tread 28, whereas the wheel side sensor 31 detects the temperature of the air within the tire 21. Thus, it is possible to determine that the received signal with the greater temperature rise is that of the tire side sensor 32, since the tire tread 28 exhibits a greater temperature rise during running than the air within the tire 21.

Moreover, if acceleration sensors are provided for both the tire and the wheel sides, the acceleration sensor of the tire outputs a higher frequency signal than that of the wheel side. Accordingly, the ECU 64 can analyze the frequency of the received signals, and distinguish between the signal from the tire side acceleration sensor and the signal from the wheel side acceleration sensor.

In this way, the ECU 64 can analyze the vehicle wheel information obtained from the vehicle body communication device 200 in order to learn the respective attachment positions of the plurality of sensors 30 of the vehicle wheel 20, and store this information in the storage portion. The ECU 64 analyzes the vehicle wheel information at regular times, such as when the engine is started, and checks the attachment state of the sensors 30. If there is any change in the attachment state, the stored data is automatically re-initialized. Further, in the case where a request signal that does not include identification information is transmitted to the tire side sensor 32 by the vehicle body communication device 200, when a return signal is received from the tire side sensor 32 that includes identification information that is different to the identification information that is already stored in the storage portion, or when a return signal is received from the tire side sensor 32 at a position in the wheel that is different to a previous position, the ECU 64 determines that tire replacement or tire rotation has taken place. Accordingly, the ECU 64 automatically re-initializes the stored data.

As described in the aforementioned embodiments, it is possible to prevent the vehicle body communication device 200 from simultaneously receiving signals from the plurality of sensors 30 provided in the same wheel. That is, signal interference can be prevented. Particularly in the aforementioned embodiments, transmission cycles of the plurality of sensors 30 do not need to be prime number cycles that are different to each other. Therefore, the transmission cycles do not need to be long. Also, even when the vehicle body communication device 200 simultaneously receives signals from the plurality of sensors 30 by accident, it is possible to determine which sensors 30 transmit each of the signals by using the identification information included in each of the signals or the transmission cycle of each of the signal, or by analyzing each of the signals.

The invention claimed is:

1. A vehicle wheel information processing device comprising:
   a plurality of vehicle wheel communication devices which are not connected to each other, the plurality of vehicle wheel communication devices provided at least at one vehicle wheel; and
   a vehicle body communication device that communicates wirelessly with the plurality of vehicle wheel communication devices, wherein
   a transmission pattern of a signal transmitted from each of the vehicle wheel communication devices is set to be different to the transmission pattern of each other signal in such a manner that the signals of two or more vehicle wheel communication devices do not overlap each other, when requested at the same time.

2. The vehicle wheel information processing device according to claim 1, wherein,
   each vehicle wheel communication device comprises a detection sensor.

3. The vehicle wheel information processing device according to claim 1, wherein
   the plurality of vehicle wheel communication devices transmit the respective signals as respective return signals in response to a request signal from the vehicle body communication device.

4. The vehicle wheel information processing device according to claim 3, wherein
   a transmission start timing for the each return signal transmitted in response to the request signal is set to be different for each vehicle wheel communication device.

5. The vehicle wheel information processing device according to claim 3, wherein
   each vehicle wheel communication device transmits the return signal a plurality of times, and
   a transmission cycle of each return signal is set to be different for each vehicle wheel communication device.

6. The vehicle wheel information processing device according to claim 5, wherein
   each vehicle wheel communication device transmits the signal to the vehicle body communication device, each signal having a distinguishing characteristic that is different from a distinguishing characteristic of the signal transmitted from another of the vehicle wheel communication devices, and
   the distinguishing characteristic is a data format of each signal transmitted from each vehicle wheel communication device, the data formats of the respective signals transmitted from each vehicle wheel communication device being mutually different.

7. The vehicle wheel information processing device according to claim 5, wherein
   each vehicle wheel communication device transmits the signal to the vehicle body communication device, each signal having a distinguishing characteristic that is different from a distinguishing characteristic of the signal transmitted from another of the vehicle wheel communication devices, and
   the distinguishing characteristic is a magnitude of a value of each signal transmitted from the each vehicle wheel communication device, the respective magnitudes of the values of the respective signals transmitted from each vehicle wheel communication device being mutually different based upon an attachment position of each vehicle wheel communication device, and the vehicle body communication device analyzes the values of the signals transmitted from the respective vehicle wheel communication devices, and determines which of the signals has been transmitted from which of the vehicle wheel communication devices based upon the analysis.

8. The vehicle wheel information processing device according to claim 7, wherein each vehicle wheel communication device comprises a sensor, each vehicle wheel communication device transmits a value detected by the sensor, the vehicle body communication device determines which of the signals has been transmitted from which of the vehicle wheel communication devices based upon the detected values transmitted from a plurality of vehicle wheel communication devices.

9. The vehicle wheel information processing device according to claim 7, wherein the vehicle body communication device analyzes a history of each value of each signal transmitted from each vehicle wheel communication device, and determines which of the signals has been transmitted from which of the vehicle wheel communication devices based upon the analysis.

10. The vehicle wheel information processing device according to claim 7, wherein the vehicle body communication device analyzes the magnitude of each value of each signal transmitted from each vehicle wheel communication device, and determines which of the signals has been transmitted from which of the vehicle wheel communication devices based upon the analysis.

11. The vehicle wheel information processing device according to claim 3, wherein each vehicle wheel communication device transmits the return signal a plurality of times, and a transmission interval of each return signal is set at random such that the respective transmission intervals of the vehicle wheel communication devices are mutually different.

12. The vehicle wheel information processing device according to claim 1, wherein each signal has an individual identification number of the vehicle wheel communication device, the respective identification numbers for each of the vehicle wheel communication devices being mutually different, and each vehicle wheel communication device transmits the signal including the identification number thereof to the vehicle body communication device, the vehicle body communication device transmits a request signal including at least one of the identification numbers to the vehicle wheel communication devices, and each of the vehicle wheel communication devices is configured to transmit a return signal to the vehicle body communication device in the case that its individual identification number is included within the received request signal, whereby the transmission pattern of the signal transmitted from each of the vehicle wheel communication devices is set to be different to the transmission pattern of each other signal.

13. A vehicle wheel information processing device comprising:

a plurality of vehicle wheel communication devices which are provided at least at one vehicle wheel, wherein each vehicle wheel communication device comprises a sensor; and a vehicle body communication device that communicates with the plurality of vehicle wheel communication devices, wherein the plurality of vehicle wheel communication devices include a first vehicle wheel communication device that directly and wirelessly communicates with the vehicle body communication device, and a second vehicle wheel communication device that wirelessly communicates with the first vehicle wheel communication device and indirectly communicates with the vehicle body communication device by using the first vehicle wheel communication device as a relay, the first vehicle wheel communication device transmits an identification number for the first vehicle wheel communication device to the vehicle body communication device, the second vehicle wheel communication device transmits an identification number for the second vehicle wheel communication device to the vehicle body communication device via the first vehicle wheel communication device.

14. The vehicle wheel information processing device according to claim 13, wherein each vehicle wheel communication device transmits a value detected by the sensor, and the vehicle body communication device determines which of the signals has been transmitted from which of the vehicle wheel communication devices based upon the detected values transmitted from the plurality of vehicle wheel communication devices.

15. The vehicle wheel information processing device according to claim 13, wherein a transmission pattern of the signal transmitted from the first vehicle wheel communication device is different from a transmission pattern of the signal transmitted from the second vehicle wheel communication device.

16. The vehicle wheel information processing device according to claim 13, wherein the first vehicle wheel communication device transmits the signal at a transmission cycle which is different from a transmission cycle at which the second vehicle wheel communication device transmits the signal.

17. The vehicle wheel information processing device according to claim 13, wherein the one vehicle wheel is provided with a first detection sensor that detects first vehicle wheel information, and a second detection sensor that detects second vehicle wheel information, the first detection sensor being included in the first vehicle wheel communication device, and the second detection sensor being included in the second vehicle wheel communication device.

18. The vehicle wheel information processing device according to claim 17, wherein the vehicle body communication device transmits a request signal to the first vehicle wheel communication device, and in response to the transmitted request signal, the first vehicle wheel communication device (i) transmits a first signal including the detected first vehicle wheel information and an identification number for the first vehicle wheel communication device, and (ii) transfers the request signal to the second vehicle wheel communication device, and in response to the transferred request signal, the second vehicle wheel communication device transmits a second signal including the detected second vehicle wheel information and an identification number for the second vehicle wheel communication device to the first vehicle wheel communication device, and the first vehicle wheel communication device transmits the second signal from the second vehicle wheel communication device to the vehicle body communication device.

19. The vehicle wheel information processing device according to claim 17, wherein
the first vehicle wheel information is information that is different from that of the second vehicle wheel information.

20. The vehicle wheel information processing device according to claim 13, wherein
the vehicle wheel includes a wheel and a tire attached to an outer periphery of the wheel, and
one of the first and the second vehicle wheel communication devices is provided at the wheel, and the other of the first and the second vehicle wheel communication devices is provided at the tire.

21. The vehicle wheel information processing device according to claim 20, wherein
the first vehicle wheel communication device is provided at the wheel, and the second vehicle wheel communication device is provided at the tire.

22. A vehicle wheel information processing method for receiving and processing vehicle wheel information from a plurality of vehicle wheel communication devices that are not connected to each other, the plurality of vehicle wheel communication devices provided at least at one vehicle wheel, the method comprising:
a first step in which respective signals of each of the vehicle wheel communication devices at the one vehicle wheel are wirelessly transmitted to a vehicle body communication device using a transmission pattern that is different for each vehicle wheel communication device in such a manner that the signals of two or more vehicle wheel communication devices do not overlap each other, when requested at the same time; and
a second step in which the respective signals wirelessly transmitted from each vehicle wheel communication device are received by the vehicle body communication device.

23. The method according to claim 22, further comprising:
a third step in which a request signal from the vehicle body communication device is transmitted to the vehicle wheel communication devices, wherein
each vehicle wheel communication device transmits the signal in response to the request signal.

24. The method according to claim 22, further comprising:
a fourth step in which the vehicle body communication device determines which of the signals has been transmitted from which of vehicle wheel communication devices based on the respective transmission patterns.

25. A vehicle wheel information processing device comprising:
a plurality of vehicle wheel communication devices which are provided at least at one vehicle wheel, wherein each vehicle wheel communication device comprises a sensor; and
a vehicle body communication device that communicates with the plurality of vehicle wheel communication devices, wherein
the plurality of vehicle wheel communication devices include a first vehicle wheel communication device that directly and wirelessly communicates with the vehicle body communication device, and a second vehicle wheel communication device that wirelessly communicates with the first vehicle wheel communication device and indirectly communicates with the vehicle body communication device by using the first vehicle wheel communication device as a relay, and
a transmission pattern of the signal transmitted from the first vehicle wheel communication device is different from a transmission pattern of the signal from the second vehicle wheel communication device.

* * * * *